United States Patent
Pagot

(10) Patent No.: US 7,104,042 B2
(45) Date of Patent: Sep. 12, 2006

(54) SUPERCHARGED FOUR-STROKE INTERNAL-COMBUSTION ENGINE WITH VARIABLE-VOLUME EXHAUST GAS EXHAUST DEVICE AND METHOD OF OPERATION OF SUCH AN ENGINE

(75) Inventor: Alexandre Pagot, Rueil Malmaidon (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/890,996

(22) Filed: Jul. 15, 2004

(65) Prior Publication Data

US 2005/0011193 A1 Jan. 20, 2005

(30) Foreign Application Priority Data

Jul. 15, 2003 (FR) .................................. 03 08635

(51) Int. Cl.
*F01N 5/00* (2006.01)

(52) U.S. Cl. .............................. 60/281; 60/274; 60/280; 60/287; 60/324

(58) Field of Classification Search ................. 60/274, 60/278, 279, 280, 281, 287, 288, 324
See application file for complete search history.

(56) References Cited

U.S. PATENT DOCUMENTS

| | | | | |
|---|---|---|---|---|
| 2,581,668 A | * | 1/1952 | Guercken ................... | 60/614 |
| 3,672,160 A | * | 6/1972 | Kim ........................... | 60/604 |
| 4,506,633 A | | 3/1985 | Britsch | |
| 5,092,284 A | * | 3/1992 | Yamada ................. | 123/184.55 |
| 6,122,908 A | * | 9/2000 | Wirmark .................... | 60/274 |
| 6,250,073 B1 | * | 6/2001 | Zimmer et al. ............. | 60/281 |
| 6,357,227 B1 | * | 3/2002 | Neufert ....................... | 60/309 |
| 6,901,743 B1 | * | 6/2005 | Asanuma et al. ............ | 60/281 |

FOREIGN PATENT DOCUMENTS

| | | |
|---|---|---|
| DE | 19833134 | 11/1999 |
| FR | 2831609 | 5/2003 |
| FR | 2833650 | 6/2003 |
| WO | 0065210 | 11/2000 |

* cited by examiner

*Primary Examiner*—Tu M. Nguyen
(74) *Attorney, Agent, or Firm*—Antonelli, Terry, Stout and Kraus, LLP.

(57) ABSTRACT

A four-stroke supercharged internal-combustion engine includes at least two cylinders with a combustion chamber (14), an air intake (16) including a pipe (20) associated with a shutoff (21), an exhaust (18) including a pipe (22) with a shutoff (23) and exhaust gas collection system including the pipes and at least one manifold (22, 24; 64,66). The engine includes a capacity and a controller for increasing the collected exhaust gas volume during high-speed running of the engine.

15 Claims, 2 Drawing Sheets

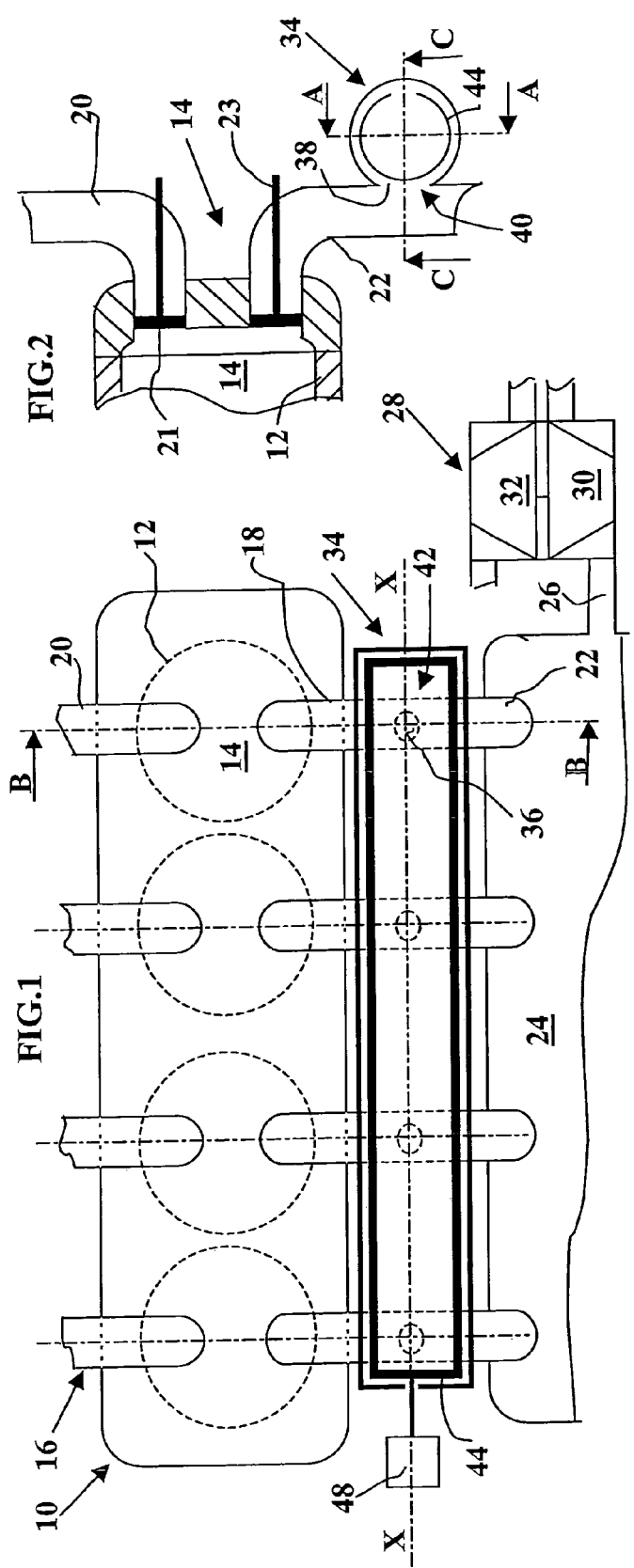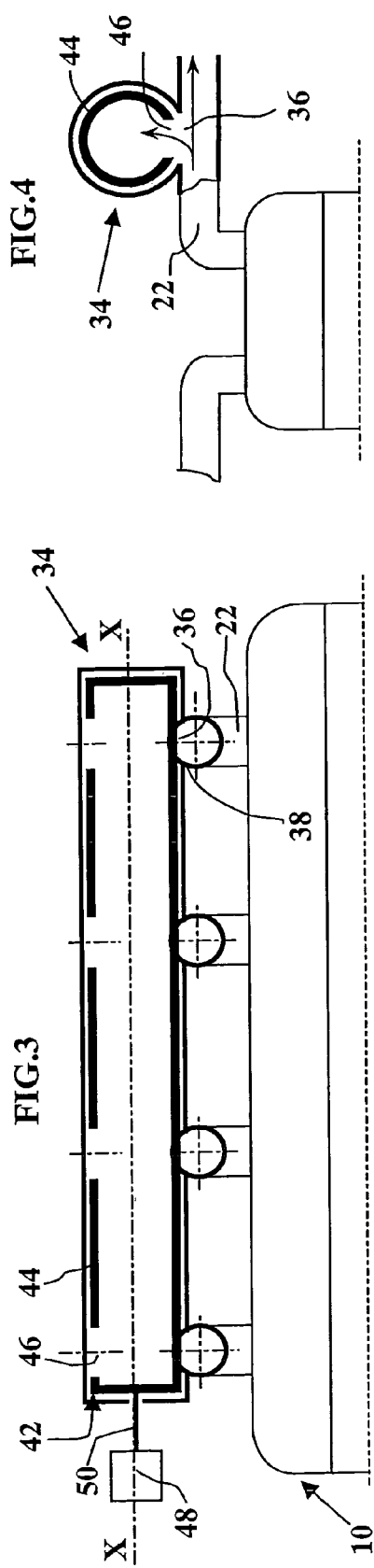

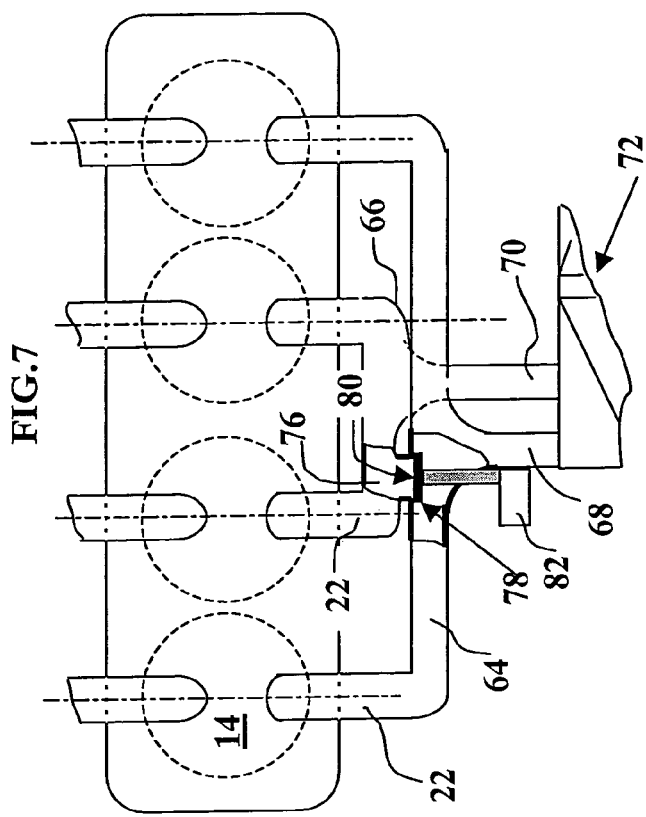
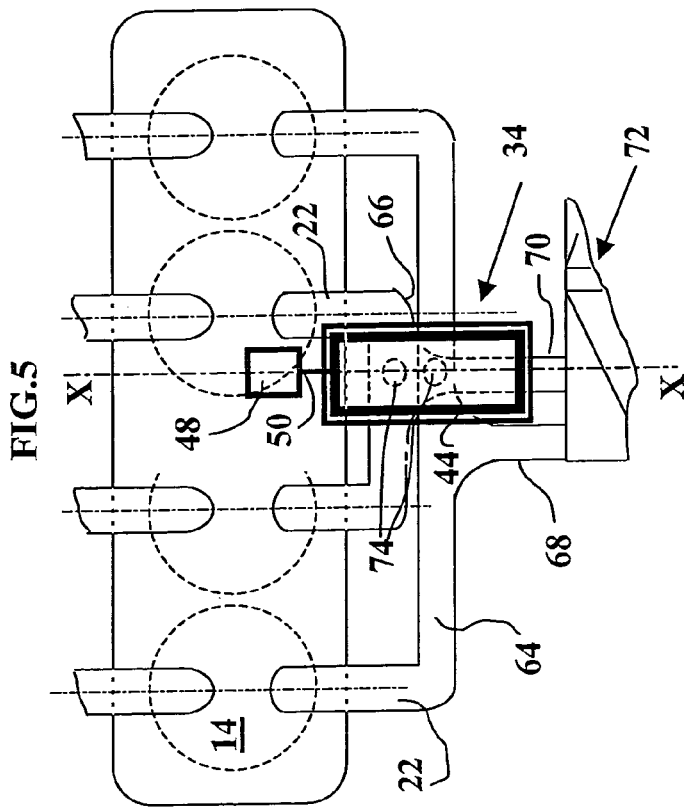
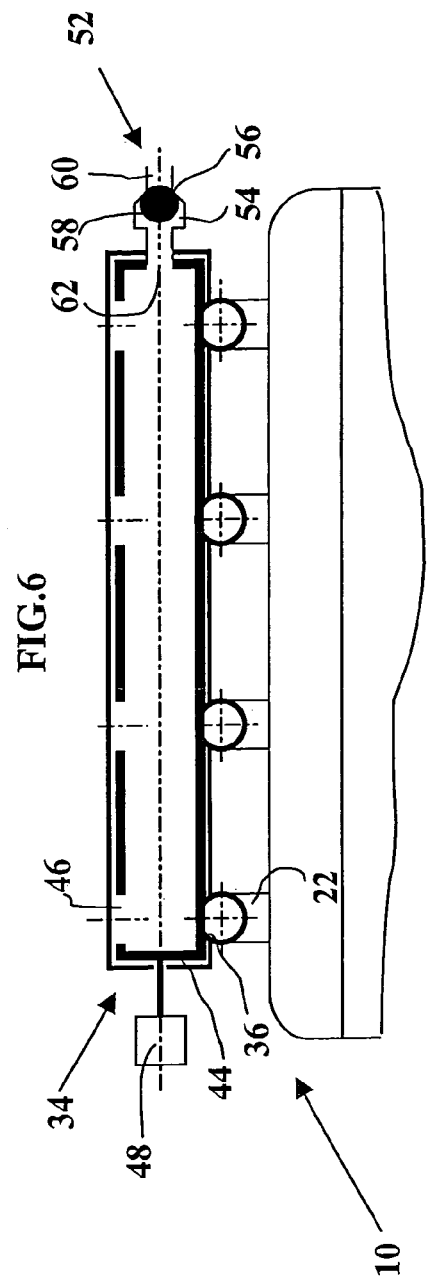

SUPERCHARGED FOUR-STROKE INTERNAL-COMBUSTION ENGINE WITH VARIABLE-VOLUME EXHAUST GAS EXHAUST DEVICE AND METHOD OF OPERATION OF SUCH AN ENGINE

FIELD OF THE INVENTION

The present invention relates to a four-stroke supercharged internal-combustion engine with a variable-volume exhaust device for exhaust gas collection.

BACKGROUND OF THE INVENTION

A four-stroke internal-combustion engine generally comprises a multiplicity of cylinders including a combustion chamber in which combustion of a mixture of fluids, generally air, and of a fuel takes place. The result of this combustion generates burnt gas or exhaust gas which is discharged from these chambers.

The torque delivered by such an engine notably depends on the amount of air fed into the combustion chamber of this engine, this amount of air being itself proportional to the density of this air. Thus, if a high torque is required for this engine, the air is compressed before it enters the combustion chamber. This air, generally referred to as supercharged air, is compressed by any known means such as a turbocompressor or a driven compressor such as a screw compressor for example.

If a turbocompressor is used, part of the energy lost in the exhaust gas is recovered by means of a turbine placed in the exhaust gas stream. This energy is used positively to compress the intake air, which increases air filling and therefore engine performances. Usually, this exhaust gas comes from one or more exhaust manifolds connected to the exhaust means of the cylinders.

As it is well-known in the art, the flow rate of the exhaust gas coming from the combustion chambers varies quite significantly between low-speed and high-speed running of the engine.

For low engine speeds, it is necessary to use specific exhaust manifolds so as to best recover the energy of the exhaust gas in order to drive the turbine. This is generally achieved using an exhaust manifold with small sections and volumes so as to best guide the exhaust pressure waves and to recover as much energy as possible to drive the turbine.

For high engine speeds, the small sections and volumes of such manifolds penalize emptying of the cylinders and increase pumping losses. Discharge of the burnt gas is thus slowed down and part of the gas is not discharged from the combustion chamber of the engine. This residual burnt gas generates engine knock for spark-ignition internal-combustion engines because of the high temperature thereof and furthermore limits fresh air filling of the combustion chamber during the intake phase of the engine.

The present invention aims to overcome the aforementioned drawbacks by means of an engine comprising a burnt gas discharge device of simple design, applicable to all engine speeds while absorbing the volume variations of the exhaust gas without penalizing the engine performances.

SUMMARY OF THE INVENTION

The present invention thus relates to a four-stroke supercharged internal-combustion engine comprising at least two cylinders with a combustion chamber, an air intake means including a pipe associated with a shutoff means, an exhaust means including a pipe with a shutoff means and exhaust gas collection means comprising said pipes and at least one manifold, characterized in that it comprises means for increasing the collected exhaust gas volume during high-speed running of said engine.

The increase means can comprise a capacity selectively communicated with the exhaust pipes.

The increase means can comprise a capacity selectively communicated with at least one manifold.

The increase means can comprise a capacity consisting of one of the manifolds selectively communicated with the other manifold, when the exhaust gas collection means comprise a first and a second manifold.

The engine can comprise means for shutting off communication with the increase means.

Advantageously, the shutoff means can be controlled by a control means.

Preferably, the shutoff means can comprise a rotary plug.

Alternatively, the shutoff means can comprise a valve.

Preferably, the plug can comprise ports.

The invention also relates to a method of operation of a supercharged internal-combustion engine comprising at least two cylinders with a combustion chamber, an air intake means including a pipe associated with a shutoff means, an exhaust means including a pipe with a shutoff means and exhaust gas collection means comprising said pipes and at least one manifold, characterized in that, during high-speed running of the engine, the exhaust gas is discharged, on the one hand, to the collection means and, on the other hand, to means for increasing the collected exhaust gas volume and in that, during low-speed running of the engine, the exhaust gas is discharged to the collection means.

During low-speed running of the engine, external air can be injected into the means for increasing the collected exhaust gas volume.

BRIEF DESCRIPTION OF THE FIGURES

Other features and advantages of the invention will be clear from reading the description hereafter, given by way of non limitative example, with reference to the accompanying drawings wherein:

FIG. 1 diagrammatically shows an internal-combustion engine according to the invention with a partial section along line AA of FIG. 2, FIG. 2 diagrammatically shows the engine according to the invention with a partial section along line BB of FIG. 1, FIG. 3 illustrates the engine according to the invention with a partial schematic section along line CC of FIG. 2, FIG. 4 diagrammatically illustrates the engine according to the invention in active position, FIG. 5 is another embodiment of an engine according to the invention with a partial section, FIG. 6 is a diagrammatic view, with a partial section, of a variant that can be used for the engines of FIGS. 1 to 5, and FIG. 7 is yet another embodiment of an engine according to the invention with a local section.

DETAILED DESCRIPTION

FIGS. 1 to 4 show a four-stroke internal-combustion engine 10 comprising at least two cylinders 12, four here, with a combustion chamber 14 and at least one intake means 16 and at least one exhaust means 18. The intake means generally consists of an intake pipe 20 and a shutoff means such as a valve 21, and the exhaust means comprises an exhaust pipe 22 with a shutoff means such as a valve 23.

Exhaust pipes 22 are connected to a manifold 24 intended for the burnt gas from the combustion chambers. Outlet 26 of this manifold is connected to the inlet of a turbocompressor 28 and more particularly to the inlet of a turbine 30 driving a compressor 32 so as to compress the air to be allowed into the combustion chambers through intake pipes 20. The exhaust gas collection means thus consist of pipes 22 and manifold 24. These means have a specific section and volume, generally small, allowing to best recover the energy of the exhaust gas and to guide the exhaust pressure waves so as to drive turbine 30 and consequently to compress the intake air.

This engine further comprises means for increasing the volume of the collected exhaust gas from the combustion chambers of the engine, which can be used when the engine runs at high speed.

As shown in FIGS. 1 to 4, these means comprise a capacity 34 of tubular cylindrical general shape and of axis XX closed at its two axial ends. This capacity selectively communicates with each exhaust pipe 22 through communication passages 36 provided in these pipes, between cylinders 14 and manifold 24, and in the capacity. The capacity therefore comprises orifices 38 arranged on the peripheral wall thereof and exhaust pipes 22 are also provided with orifices 40 which, in the example described, match those of the capacity. Shutoff means 42 for these passages are provided in form of a hollow plug 44 closed at its axial ends, housed in the capacity, which is coaxial to this capacity. This plug comprises ports 46 whose position and dimensions substantially correspond to the dimensions and positions of passages 36. The plug is driven in rotation around axis XX by any known means such as an electric micromotor 48 connected to plug 44 by a pin 50. This micromotor receives instructions through means controlling running of the engine, such as the engine control.

During low-speed running of the engine (from about 1000 rpm to about 3000 rpm), as illustrated in FIGS. 1 to 3, the micromotor is given instructions for plug 44 to be in the position illustrated in these figures, communication passages 36 being closed by the peripheral wall of the plug (FIGS. 1 to 3). The burnt gas resulting from combustion in each chamber 14 is discharged through each exhaust pipe 22. This gas is directly sent to manifold 24 without entering the capacity as communication passages 36 are closed. At the outlet 26 of this manifold, the exhaust gas enters turbocompressor 28 by driving into rotation turbine 30 which drives the compressor.

This layout allows to take advantage of the specific configuration of the manifold, in section as well as in volume, to best drive the turbine.

During high-speed running, i.e., by way of example, above 3000 rpm, the flow rate and consequently the volume of the exhaust gas coming from the combustion chambers is higher. Micromotor 48 is given instructions by the engine control to drive plug 44 into rotation so that the position of its ports 46 matches that of communication passages 36 between exhaust pipes 22 and capacity 34. In this position, the exhaust gas discharged from combustion chamber 14 through exhaust pipe 22 during the exhaust phase of a cylinder is simultaneously sent to manifold 24 and capacity 34, and more precisely into plug 44 (FIG. 4). The manifold and the capacity are therefore simultaneously filled with the burnt gas carried by pipe 22. The cylinder in the exhaust phase therefore has a larger filling volume possibility for collection of the gas, which provides good discharge of the gas. After filling of the capacity with the burnt gas, the gas is discharged to manifold 24 through the other communication passages provided in the exhaust pipes of the cylinders that are not in the exhaust phase. The gas flowing out of the manifold is then sent to the turbine of the turbocompressor.

Of course, without departing from the scope of the invention, capacity 34 can directly communicate with manifold 24. In this case, two communication passages are sufficient between this capacity and this manifold to ensure additional exhaust gas collection during high-speed running of the engine and discharge of the gas present in the capacity to the manifold.

FIG. 5 shows another embodiment of an engine according to the invention similar to that of FIGS. 1 to 4 and essentially comprising the same reference numbers as these figures.

In this embodiment, exhaust pipes 22 of the first cylinder and of the last cylinder, from the left of FIG. 5, are connected to a first manifold 64 whereas exhaust pipes 22 of the second and third cylinders are connected to a second manifold 66. This configuration, referred to as separated-manifold configuration, is used in combination with a specific double-inlet turbocompressor 72 technology, referred to as twin-scroll turbocompressor. In this type of turbocompressor, the exhaust gas inlet, at the level of the turbine, is divided into two sections, a first section connected by means of first manifold 64 to the exhausts of a part of the cylinders and a second section connected by second manifold 66 to the exhausts of the other cylinders. Thus, outlet 68 of first manifold 64 is connected to the first section whereas outlet 70 of the second manifold is connected to the second section.

This engine also comprises a capacity 34 of general axis XX, similar to that of FIGS. 1 to 4, which selectively communicates with first 64 and second 66 manifolds through two communication passages 74, one for each manifold. This capacity comprises shutoff means for passages 74, also in form of a hollow plug 44 housed inside the capacity. This plug comprises, as already described in connection with FIGS. 1 to 4, ports whose positions and dimensions substantially correspond to the dimensions and positions of passages 74. The plug is driven in rotation around axis XX by any known means such as an electric micromotor 48 connected to plug 44 by a pin 50.

Running of such an engine is substantially identical to that described above.

During low-speed running of the engine, plug 44 is in such a position that communication passages 74 are closed by the peripheral wall of this plug. The burnt gas resulting from combustion in each chamber 14 is discharged through each exhaust pipe 22 into the respective manifolds 64 and 66 without entering the capacity. The exhaust gas flowing out of the manifolds through outlets 68 and 70 is then sent to the inlet sections of turbocompressor 72 to drive into rotation the turbine which drives the compressor.

This layout also allows to take advantage of the specific configuration of the manifolds, in section as well as in volume, to best drive the turbine and to prevent the exhaust waves from returning into the manifolds.

During high-speed running of the engine, micromotor 48 controls in rotation plug 44 so that the position of its ports matches the position of communication passages 74 between manifolds 64, 66 and capacity 34. In this position, during the exhaust phase of a cylinder, the exhaust gas discharged from combustion chamber 14, for example through exhaust pipe 22 of the first cylinder, is simultaneously sent to first manifold 64 and to capacity 34, more particularly inside plug 44. This manifold and this capacity are thus simultaneously filled with the burnt gas carried by pipe 22. The cylinder in the exhaust phase thus has a greater volume possibility for collection of the burnt gas. After filling of the capacity with the burnt gas, the gas is discharged through second communication passage 74 to second manifold 66, then to outlet 70 whereas the gas present in first manifold 64 is sent to outlet 68.

Of course, without departing from the scope of the invention, this capacity can be connected by communication passages to the outlet pipes 68 and 70 of manifolds 64 and 66 instead of the communication passages in manifolds 64, 66.

Furthermore, the capacity can also be connected by communication passages to exhaust pipes 22 in a layout similar to that described in connection with FIGS. 1 to 4.

In the variant of FIG. 6, which can be used for the engines described in connection with FIGS. 1 to 5, the engine also comprises a means 52 for injecting air into capacity 34, this air injection facilitating post-treatment of certain pollutants present in the exhaust gas. This air injection is generally carried out at low engine speed, preferably during cold start-up of the engine.

In fact, the exhaust gas contains unburnt hydrocarbons (HC) whose discharge to the atmosphere has to be minimized. To allow treatment of these HC, internal-combustion engines generally comprise anti-pollution devices such as catalysts, which are connected to the engine exhaust and allow a major part of these HC to be subjected to an oxidation treatment. These catalysts are operational from a certain initiation temperature referred to as light-off, which can be reached only when the exhaust gas has exceeded a given temperature level. As it is known in the art, to carry out such an operation, additional oxygen has to be supplied in the exhaust gas by means of an injection of external air so as to carry out an additional oxidation of this gas in order to raise its temperature.

This air injection means 52 comprises, by way of example, a check valve 54 with a seat 56 housing a ball 58. This check valve is provided with an external air inlet 60 connected to any air supply means and an outlet 62 opening into the capacity and more particularly inside plug 44. In idle position, the ball rests on seat 56 and closes air inlet 60. In case of an exhaust gas post-treatment operation, micromotor 48 is given instructions from the engine control for plug 44 to be driven into rotation until the position of ports 46 matches that of communication passages 36 provided between exhaust pipes 22 and capacity 34. External fresh air is then fed through inlet 60 into check valve 54 with a sufficient pressure to overcome the pressure of the exhaust gas present in this capacity and to push the ball out of its seat. This fresh air enters the hollow volume of plug 44 and mixes with the exhaust gas while increasing the amount of oxygen present in the gas. This mixture is discharged from capacity 34 to manifold 24 or manifolds 64, 66 so as to mix with the exhaust gas present in this manifold. This new mixture is then sent to the HC treatment device (not shown) which can be located upstream or downstream from the turbocompressor. Once the air injection operation complete, micromotor 48 controls in rotation plug 44 so that its peripheral wall closes up communication passages 36 and the external air supply is closed.

In the embodiment of FIG. 7, which is similar to that of FIG. 5 and therefore comprises the same reference numbers, the means for increasing the collected exhaust gas volume during high-speed running of the engine consist of manifolds 64 or 66 themselves.

As previously described for FIG. 6, this engine comprises two manifolds 64 and 66 whose outlets 68 and 70 are connected to the turbine inlet of a twin-scroll turbocompressor 72.

To absorb the collected gas volume variation, notably between low-speed and high-speed running of the engine, a communication passage 76 is provided between the two manifolds so as to communicate them. This passage is provided with a shutoff means 78, for example in form of a valve 80 controlled by a control means 82.

At low engine speeds, communication passage 76 is closed up by valve 80 and the exhaust gas is conventionally discharged into manifolds 64, 66. The exhaust gas flowing from these manifolds is then sent to the inlet of turbocompressor 72 so as to drive into rotation the turbine it contains.

At high engine speeds, instructions are sent by the engine control to control means 82 so as to actuate check valve 80 in order to free communication passage 76. Thus, during the exhaust phase of a cylinder, the exhaust gas discharged from combustion chamber 14 through an exhaust pipe 22 is sent into the manifold dedicated thereto, then, through passage 76, into the other manifold then acting as a capacity. The two manifolds are thus filled with the burnt gas and the cylinder in the exhaust phase has a larger volume for collection of the gas, one of the manifolds being used to absorb the volume variation of the exhaust gas.

The present invention is not limited to the embodiments described and includes any variant or equivalent.

The invention claimed is:

1. A method of operation of a supercharged internal-combustion engine comprising at least two cylinders with a combustion chamber, an air intake means including a pipe associated with a shutoff means, an exhaust means including a pipe with a shutoff means and exhaust gas collection means comprising said pipes and at least one manifold, characterized in that, during high-speed running of the engine, the exhaust gas is discharged, on the one hand, to collection means and, on the other hand, to means for increasing the collected exhaust gas volume and in that, during low-speed running of the engine, the exhaust gas is discharged to collection means.

2. A method as claimed in claim 1, characterized in that, during low-speed running of the engine, external air is injected into means for increasing the collected exhaust gas volume.

3. A four-stroke supercharged internal-combustion engine comprising at least two cylinders with a combustion chamber, an air intake means including an intake pipe associated with a shutoff means, an exhaust means including an exhaust pipe with a shutoff means, exhaust gas collection means comprising said pipes and at least one manifold and increase means for increasing the collected exhaust gas volume during high-speed running of said engine.

4. A supercharged internal-combustion engine as claimed in claim 3, characterized in that the increase means comprise a capacity selectively communicated with the at least one manifold.

5. A supercharged internal-combustion engine as claimed in claim 3, wherein the exhaust gas collection means comprise a first and a second manifold, characterized in that the increase means comprise a capacity consisting of one of the manifolds selectively communicated with the other manifold.

6. A supercharged internal-combustion engine as claimed in claim 3, characterized in that the increase means comprise a capacity selectively communicated with the exhaust pipes.

7. A supercharged internal-combustion engine as claimed in claim 6, characterized in that said engine comprises shutoff means for closing up communication with increase means.

8. A supercharged internal-combustion engine as claimed in claim 7, characterized in that shutoff means are controlled by a control means.

9. A supercharged internal-combustion engine as claimed in claim 7, characterized in that the shutoff means comprise a valve.

10. A supercharged internal-combustion engine as claimed in claim 7, characterized in that the shutoff means comprise a rotary plug.

11. A supercharged internal-combustion engine as claimed in claim 10, characterized in that the rotary plug comprises ports.

12. A supercharged internal combustion engine according to claim 1, wherein the increase means comprises a capacity and means for selectively communicating the capacity with the exhaust means.

13. A supercharged internal combustion engine according to claim 12, wherein the means for selectively communicating the capacity with the exhaust means comprises a valve.

14. A supercharged internal combustion engine according to claim 12, wherein the means for selectively communicating the capacity with the exhaust means comprise a rotary plug and control means for rotating the rotary plug.

15. A supercharged internal combustion engine according to claim 14, wherein the rotary plug comprises a hollow plug closed at axial ends thereof and having ports at positions and having dimensions corresponding to positions and dimensions of passages in the exhaust pipes, the plug being coaxial with the capacity and being rotatable by the control means for rotating the plug to align the ports with the passages during high-speed running of said engine and to rotate the ports out of alignment with the passages during low-speed running of said engine.

* * * * *